United States Patent
Blunk

(10) Patent No.: US 9,647,277 B2
(45) Date of Patent: May 9, 2017

(54) HYDROLYTICALLY-STABLE HYDROPHILIC COATING FOR BIPOLAR PLATES

(75) Inventor: Richard H. Blunk, Macomb Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1779 days.

(21) Appl. No.: 13/014,484

(22) Filed: Jan. 26, 2011

(65) Prior Publication Data

US 2012/0189938 A1    Jul. 26, 2012

(51) Int. Cl.
*H01M 8/04* (2016.01)
*H01M 8/00* (2016.01)
*B05D 5/12* (2006.01)
*H01M 8/0228* (2016.01)
*H01M 8/0215* (2016.01)

(52) U.S. Cl.
CPC ....... *H01M 8/0228* (2013.01); *H01M 8/0215* (2013.01)

(58) Field of Classification Search
CPC .............................. H01M 8/215; H01M 8/228
USPC ......................................................... 429/457
See application file for complete search history.

(56) References Cited

U.S. PATENT DOCUMENTS

2007/0141238 A1* 6/2007 Angelopoulos et al. ..... 427/115
2009/0092874 A1* 4/2009 Abd Elhamid et al. ........ 429/30

* cited by examiner

*Primary Examiner* — Miriam Stagg
*Assistant Examiner* — Brent Thomas
(74) *Attorney, Agent, or Firm* — Brooks Kushman P.C.

(57) ABSTRACT

A method for forming a hydrolytically-stable hydrophilic coating on a fuel cell flow field plate comprises contacting a flow field plate with a titanium oxide sol to form a titanium oxide layer disposed upon the flow field plate. The coated flow field plate is subsequently contacted with a silicon oxide sol to form a silicon oxide/titanium oxide bilayer disposed upon the flow field plate. A flow field plate formed by the method is also provided.

20 Claims, 5 Drawing Sheets

HYDROLYTICALLY-STABLE HYDROPHILIC COATING FOR BIPOLAR PLATES

BACKGROUND OF THE INVENTION

1. Field of the Invention

The present invention is related to bipolar plates with improved hydrophilicity for fuel cell applications.

2. Background

Fuel cells are used as an electrical power source in many applications. In particular, fuel cells are proposed for use in automobiles to replace internal combustion engines. A commonly used fuel cell design uses a solid polymer electrolyte ("SPE") membrane or proton exchange membrane ("PEM") to provide ion transport between the anode and cathode.

In proton exchange membrane type fuel cells, hydrogen is supplied to the anode as fuel and oxygen is supplied to the cathode as the oxidant. The oxygen can either be in pure form ($O_2$) or air (a mixture of $O_2$ and $N_2$). PEM fuel cells typically have a membrane electrode assembly ("MEA") in which a solid polymer membrane has an anode catalyst on one face, and a cathode catalyst on the opposite face. The anode and cathode layers of a typical PEM fuel cell are formed of porous conductive materials, such as woven graphite, graphitized sheets, or carbon paper to enable the fuel to disperse over the surface of the membrane facing the fuel supply electrode. Each electrode has finely divided catalyst particles (for example, platinum particles), supported on carbon particles, to promote oxidation of hydrogen at the anode and reduction of oxygen at the cathode. Protons flow from the anode through the ionically conductive polymer membrane to the cathode where they combine with oxygen to form water, which is discharged from the cell. The MEA is sandwiched between a pair of porous gas diffusion layers ("GDL") which, in turn, are sandwiched between a pair of non-porous, electrically conductive elements or plates. The plates function as current collectors for the anode and the cathode, and contain appropriate channels and openings formed therein for distributing the fuel cell's gaseous reactants over the surface of respective anode and cathode catalysts. In order to produce electricity efficiently, the polymer electrolyte membrane of a PEM fuel cell must be thin, chemically stable, proton transmissive, non-electrically conductive and gas impermeable. In typical applications, fuel cells are provided in arrays of many individual fuel cell stacks in order to provide high levels of electrical power.

The electrically conductive plates currently used in fuel cells provide a number of opportunities for improving fuel cell performance. For example, it is desirable to minimize the agglomeration of water droplets within flow channels in the plates. To this end, fuel cells are typically coated with a hydrophilic coating. Currently, hydrophylic layers are applied to a conductive plate via a multilayer adsorption (MLA) process. Typically, such processes require 4 dip cycles (i.e., 4 bilayers, 1 bilayer consists of a layer of silica on top of a layer of a cationic polymer) in a hydrophilic coating such as silica-based NanoX. Although such processes work reasonably well, MLA methods are undesirably labor intensive often taking up to 40 minutes to complete.

Although recent stack data indicate that a superhydrophilic coating is not necessary in the active area of Au-coated stainless steel bipolar plates to pass low power stability (LPS), future plate designs and system operating conditions may require such a coating for water management. Presently, silica-based hydrophilic coatings (e.g., EMS, NanoX) applied using a multilayer adsorption (MLA) process (includes use of a cationic polymer) are not sufficiently water stable. In stacks S0340 (3500 hrs) and S0949 (5100 hrs), the silica-coated plates became grossly non-wicking (less hydrophilic) after fuel cell exposure due to silica and cationic polymer dissolution. A more hydrolytically stable material is needed to replace the water-soluble cationic polymer.

Accordingly, there is a need for improved methodology for applying hydrophilic coatings at the surfaces of bipolar plates used in fuel cell applications.

SUMMARY OF THE INVENTION

The present invention solves one or more problems of the prior art by providing in at least one embodiment a method for coating a hydrolytically-stable hydrophilic coating on a fuel cell component. The method comprises contacting a fuel cell component with a titanium oxide-containing liquid to form a titanium oxide-containing layer adhered to the fuel cell component. The titanium oxide-containing layer is optionally dried. In a subsequent step, the fuel cell component is contacted with a silicon oxide-containing liquid to form a silicon oxide coating adhered to the titanium oxide layer. The silicon oxide-containing layer is then optionally dried. The steps of the present embodiment are optionally repeated one or more additional times to produce a plurality of bilayers on the fuel cell component. The fuel cell component coated in accordance to the method of the present embodiment is found to have good hydrophilicity and a low water contact angle. Moreover, these coated articles are found to retain these properties after continued exposure to water.

In another embodiment of the present invention, a method for forming a fuel cell with a coated flow field plate is provided. The method includes a step of placing a membrane electrode assembly between a first flow field plate and a cathode flow field plate. At least one of the first flow field plate and the second flow field plate are coated by contacting a fuel cell component with a titanium oxide-containing liquid to form a titanium oxide-containing layer adhered to the fuel cell component. The titanium oxide-containing layer is then optionally dried. In a subsequent step, the fuel cell component is contacted with a silicon oxide-containing liquid to form a silicon oxide coating adhered to the titanium oxide layer. The silicon oxide-containing layer is then optionally dried. The steps of the present embodiment are optionally repeated one or more additional times to produce a plurality of bilayers on the fuel cell component.

In yet another embodiment of the present invention, a fuel cell including a coated fuel cell component is provided. The fuel cell component, which is usually a flow field plate is formed by the methods set forth above.

DETAILED DESCRIPTION OF THE PREFERRED EMBODIMENT(S)

Reference will now be made in detail to presently preferred compositions, embodiments and methods of the present invention which constitute the best modes of practicing the invention presently known to the inventors. The Figures are not necessarily to scale. However, it is to be understood that the disclosed embodiments are merely exemplary of the invention that may be embodied in various and alternative forms. Therefore, specific details disclosed herein are not to be interpreted as limiting, but merely as a representative basis for any aspect of the invention and/or as a representative basis for teaching one skilled in the art to variously employ the present invention.

Except in the examples, or where otherwise expressly indicated, all numerical quantities in this description indicating amounts of material or conditions of reaction and/or use are to be understood as modified by the word "about" in describing the broadest scope of the invention. Practice within the numerical limits stated is generally preferred. Also, unless expressly stated to the contrary: percent, "parts of," and ratio values are by weight; the description of a group or class of materials as suitable or preferred for a given purpose in connection with the invention implies that mixtures of any two or more of the members of the group or class are equally suitable or preferred; description of constituents in chemical terms refers to the constituents at the time of addition to any combination specified in the description, and does not necessarily preclude chemical interactions among the constituents of a mixture once mixed; the first definition of an acronym or other abbreviation applies to all subsequent uses herein of the same abbreviation and applies mutatis mutandis to normal grammatical variations of the initially defined abbreviation; and, unless expressly stated to the contrary, measurement of a property is determined by the same technique as previously or later referenced for the same property.

It is also to be understood that this invention is not limited to the specific embodiments and methods described below as specific components and/or conditions may, of course, vary. Furthermore, the terminology used herein is used only for the purpose of describing particular embodiments of the present invention and is not intended to be limiting in any way.

It must also be noted that, as used in the specification and the appended claims, the singular form "a," "an," and "the" comprise plural referents unless the context clearly indicates otherwise. For example, reference to a component in the singular is intended to comprise a plurality of components. Throughout this application, where publications are referenced, the disclosures of these publications in their entireties are hereby incorporated by reference into this application to more fully describe the state of the art to which this invention pertains.

Figure 1:
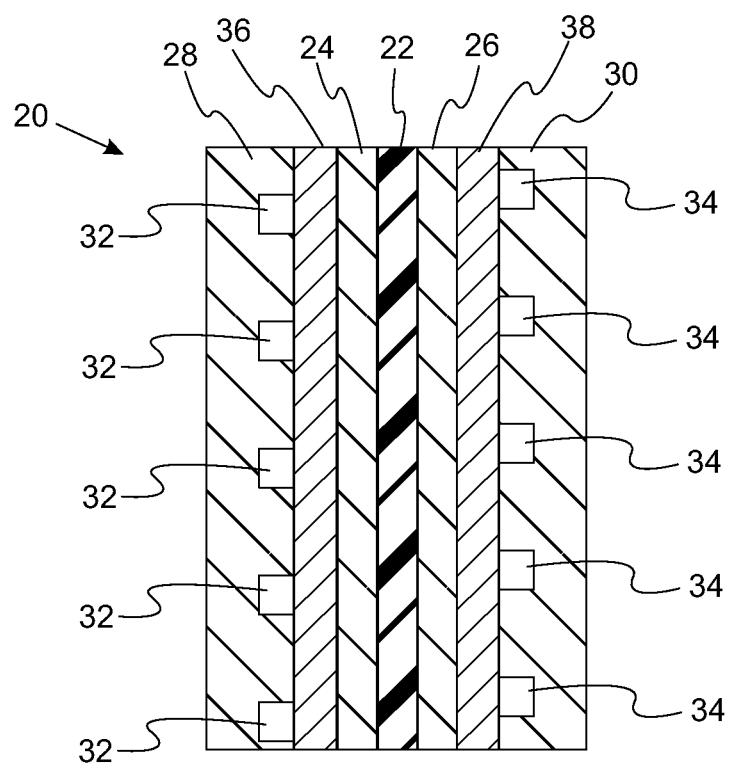
FIG. 1 is a cross sectional view of a fuel cell incorporating the bipolar plates of an embodiment of the present invention.

With reference to FIG. 1, a cross sectional view of a fuel cell that incorporates an embodiment of a flow field plate is provided. PEM fuel cell 20 includes polymeric ion conducting membrane 22 disposed between cathode catalyst layer 24 and anode catalyst layer 26. Fuel cell 20 also includes electrically conductive flow field plates 28, 30 which include gas channels 32 and 34. Flow field plates 28, 30 are either bipolar plates (illustrated) or unipolar plates (i.e., end plates). In a refinement, flow field plates 28, 30 are formed from a metal plate (e.g., stainless steel) optionally coated with a precious metal such as gold or platinum. In another refinement, flow field plates 28, 30 are formed from conducting polymers which also are optionally coated with a precious metal. Flow field plates 28, 30 are coated with a titanium oxide/silicon oxide bilayer as set forth below. Gas diffusion layers 36 and 38 are also interposed between flow field plates and a catalyst layer. Advantageously, flow field plates 28, 30 are made by the processes set forth below.

With reference to FIG. 2, a schematic flowchart of a method for forming a coated fuel cell component is provided. In step $a^1$), fuel component 40 is immersed in bath 42 which contains titanium oxide-containing liquid 44. In a variation, fuel cell component 40 is a flow field plate. Examples of such flow field plates include bipolar plates and unipolar plates. In one refinement, the flow field plate comprises a metal such as stainless steel. In another refinement, the flow field plate comprises an electrically conductive polymer. In a refinement, titanium oxide-containing liquid 44 includes a solvent with a titanium compound dispersed therein. The titanium oxide-containing liquid 44 may be a liquid, an emulsion, a colloid, etc. In a particularly useful refinement, titanium oxide-containing liquid 44 includes titanium oxide particles, and in particular, titanium oxide nanoparticles. Suitable solvents include, but are not limited to, water and alcohols (methanol, ethanol, isopropanol, etc.). In a further refinement, the titanium oxide nanoparticles have a size from about 2 nanometers to about 100 nanometers. In still another refinement, the titanium oxide nanoparticles have a size from about 2 nanometers to about 10 nanometers. In step $a^2$), the fuel cell component is removed from bath 42 to provide fuel cell component 40 coated with titanium layer 46. In step $a^3$), fuel cell component titanium-containing layer 46 is washed with a solvent to remove any unadhered titanium oxide particles. Suitable solvents include water and alcohols (methanol, ethanol, isopropanol, etc.), and combinations thereof. In step b), titanium oxide-containing layer 46 is optionally dried to form dried titanium oxide-containing layer 48. In this context, drying means that the solvent is at least partially removed by either passive evaporation or by heating.

Figure 2A:
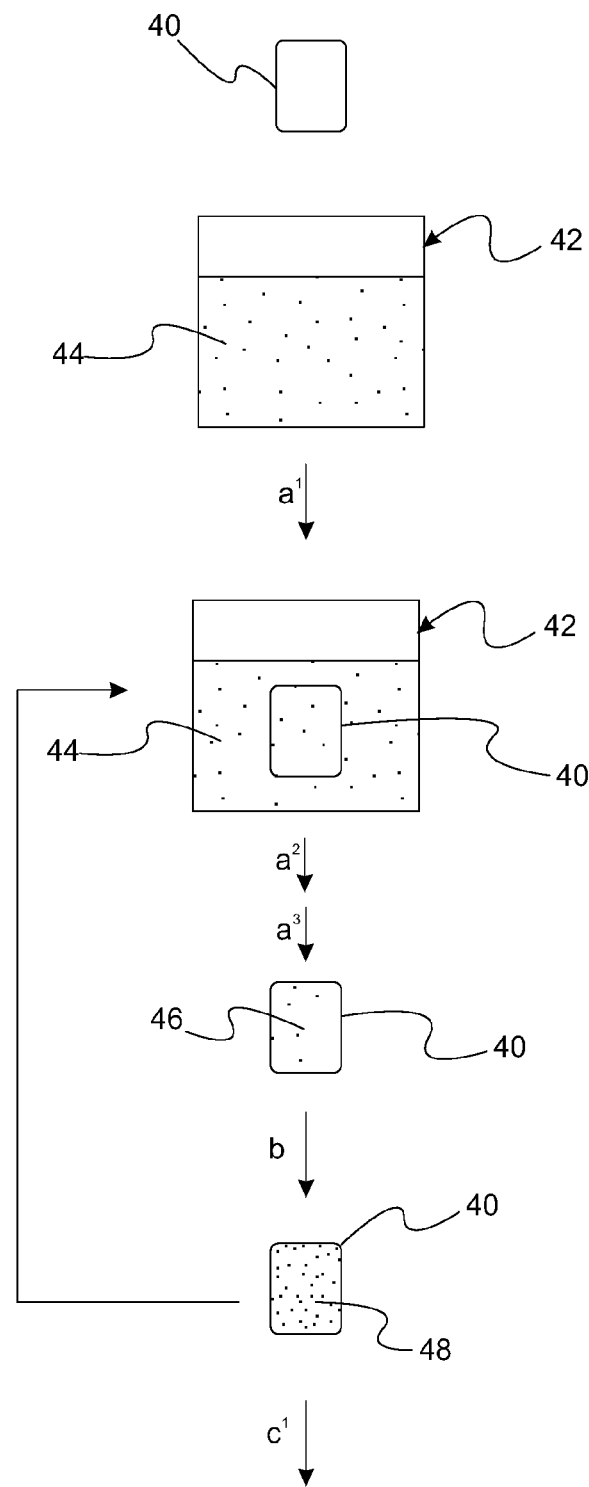
FIGS. 2A and 2B provide a schematic flowchart illustrating a method for making a coated flow field plate.
Figure 2B:
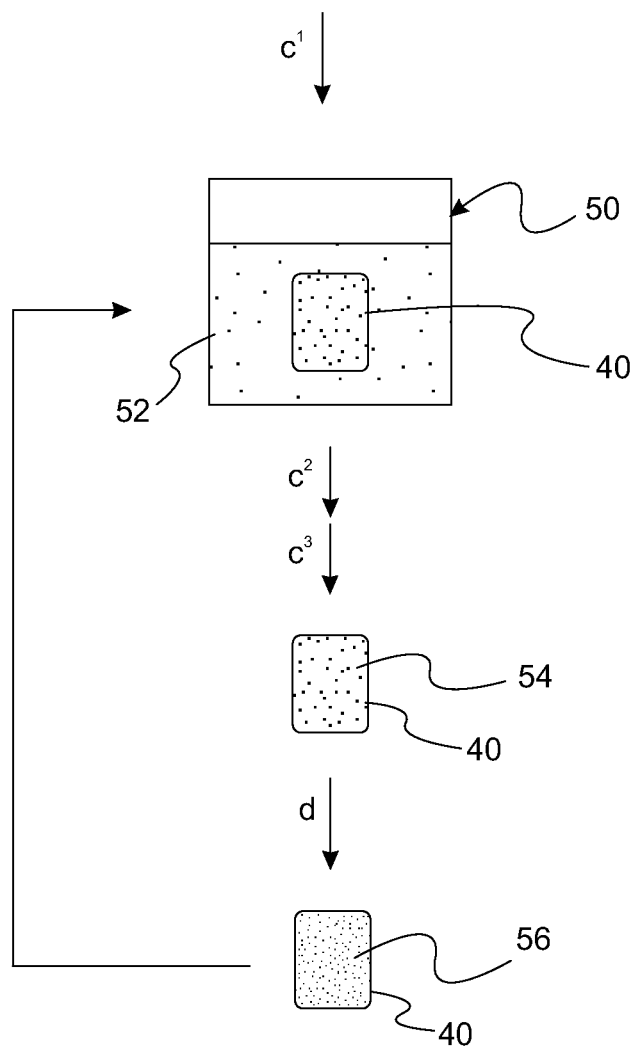

Still referring to FIGS. 2A and 2B, fuel component 40 is immersed in bath 42 which contains silicon oxide-containing liquid 44 in step $c^1$). In a refinement, silicon oxide-containing liquid 52 includes a solvent with a silicon compound dispersed therein. The silicon oxide-containing liquid 52 may be a liquid, an emulsion, a colloid, etc. In a particularly useful refinement, silicon oxide-containing liquid 52 includes silicon oxide particles, and in particular silicon oxide nanoparticles. Suitable solvents include, but are not limited to, water and alcohols (methanol, ethanol, isopropanol, etc.), and combinations thereof. In a further refinement, the silicon oxide nanoparticles have a size from about 2 nanometers to about 100 nanometers. In still another refinement, the silicon oxide nanoparticles have a size from about 2 nanometers to about 10 nanometers. In step $c^2$), the fuel cell component is removed from bath 50 such that titanium oxide-containing layer 48 is coated with silicon oxide-containing layer 54. In step $c^3$), fuel cell component silicon oxide-containing layer 54 is washed with a solvent to remove any unadhered silicon oxide particles. Suitable solvents include water and alcohols (methanol, ethanol, isopropanol, etc.), and combinations thereof. In step d), silicon oxide-containing layer 54 is optionally dried to form dried silicon oxide-containing layer 56.

In a variation of the present embodiment, the method of FIG. 2 is repeated several times in order to produce a stack of several bilayers. In general, the method is repeated 1 to 6 times to produce 1 to 6 bilayers. In a refinement, the method is repeated 4 times to produce 4 bilayers. In still another refinement, the method is repeated 1 or 2 times to produce 1 or 2 bilayers.

The fuel cell component coated in the manner set forth above is found to have superior hydrophilicity. In particular, the coated fuel cell component is found to have a water contact angle less than about 40 degrees. In another refinement, the coated fuel cell component is found to have a contact angle less than about 30 degrees. In still another refinement, the coated fuel cell component is found to have a contact angle less than about 20 degrees. In yet another embodiment, the coated fuel cell component is found to have a contact angle from about 3 to 20 degrees. Coated fuel cell components are found to retain their properties upon prolonged water exposure.

Figure 3:
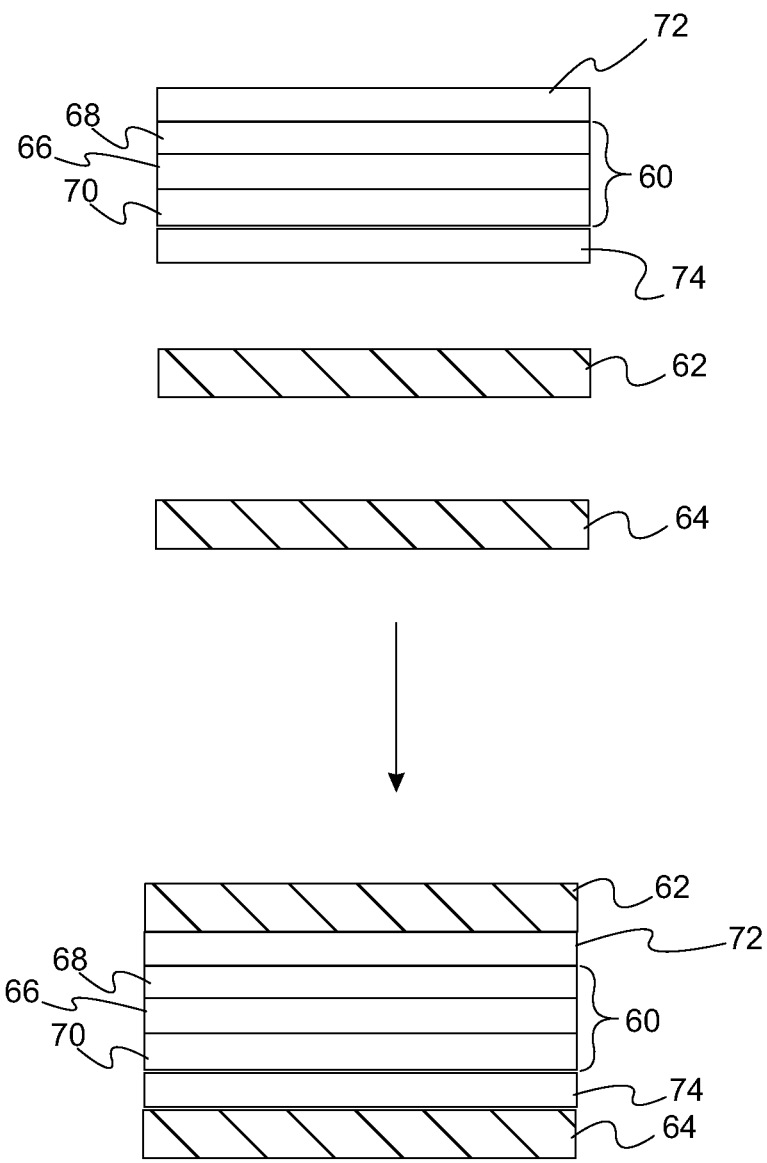
FIG. 3 is a schematic illustration of a method of assembling a fuel cell.
Figure 4:
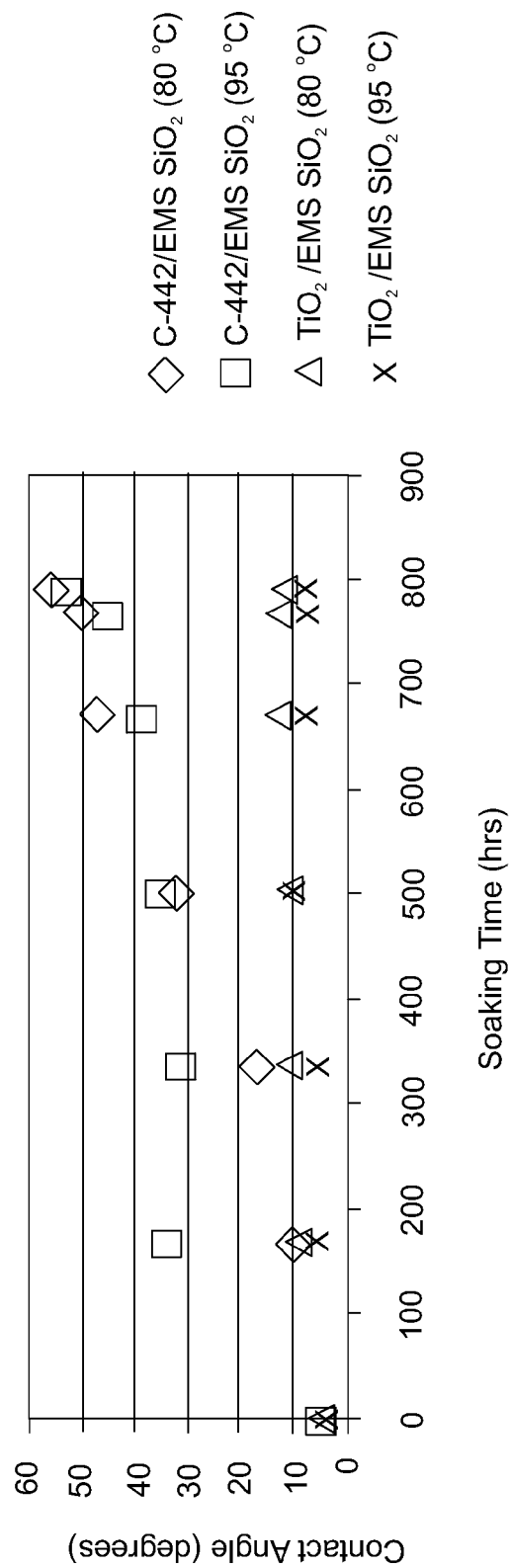
FIG. 4 provides plots of the static contact angle versus water soaking time (at 80° C. and 95° C.) for gold-coated stainless steel coupons coated with four bilayers of $SiO_2$/C-442 (polymer) and for gold-coated stainless steel samples coated with four bilayers $SiO_2/TiO_2$.

With reference to FIG. 3, a schematic illustration of a method of assembling a fuel cell is provided. The method includes step d) in which membrane electrode assembly 60 is placed between anode flow field plate 62 and cathode flow field plate 64. Membrane assembly 60 includes ion conducting membrane 66 interposed between anode 68 and cathode 70. At least one of first flow field plate 62 and a second flow field plate 64 are coated by the method set forth in FIG. 4. In a variation, gas diffusion layer 72 is interposed between anode flow field plate 62 and membrane electrode assembly 60 and gas diffusion layer 74 is interposed between cathode flow field plate 64 and membrane electrode assembly 60.

The following examples illustrate the various embodiments of the present invention. Those skilled in the art will recognize many variations that are within the spirit of the present invention and scope of the claims.

Materials: Hombikat® XXS 100 $TiO_2$ (Sachtleben Corporation) and EMS silica (Electronic Microscopy Services, Inc.) sols. The commercial $TiO_2$ sol consists of photocatalytic anatase nanoparticles suspended in water (<7 nm particle size, 18.6% $TiO_2$ weight percent), and is diluted with deionized (DI) water and ethanol to obtain a final sol composition of 6 weight percent $TiO_2$, 89 weight percent water, and 5 weight percent ethanol. The positively-charged $TiO_2$ particles (pH=2.4, $TiO_2$ isoelectric point: 5.5 to 6.0 pH) are stabilized electrostatically with nitric acid. The silica sol consists of 60 nm $SiO_2$ particles suspended in water, diluted 10-fold with water to 0.5 weight percent $SiO_2$ and pH-adjusted (pH=3.9, $SiO_2$ isoelectric point: 2.0 to 2.6 pH) with $H_2SO_4$ to enable the negatively charged $SiO_2$ particles to adsorb well in the MLA process to the pre-adsorbed, positively charged $TiO_2$ layer.

Process Details: EMS silica applied to Au-coated stainless steel coupons using an MLA process in which the alkaline-cleaned coupons are: (1) dipped into the $TiO_2$ sol for 3 minutes at room temperature to acquire a positively charged surface, (2) rinsed in deionized (DI) water with vigorous agitation for 2 minutes to remove unadhered $TiO_2$, (3) dipped into a negatively charged EMS sol for 3 minutes, and then (4) rinsed in DI water with vigorous agitation for 2 minutes to remove unbonded silica particles and to form a monolayer of silica. This generates a single $SiO_2/TiO_2$ bilayer. Table 1 provides water soaking properties of gold coated stainless steel coupons coated with four bilayers of $SiO_2$/Kemira C-442. and $SiO_2/TiO_2$. Kemira C-442 is an acrylamide/β-methacryl-oxyethyl-trimethyl-ammonium copolymer. The amount of silicon loss after 792 hours of water soaking is found to be much less for the $SiO_2/TiO_2$ coupons as compared to the $SiO_2$/C-442 coated coupons. Also, the former show a slight increase in contact angle. In Table 1, the amounts of silicon oxide and titanium oxide are determined by electron probe microanalysis (EPMA). Similarly, FIG. 3 provides plots of the static contact angle versus water soaking time (at 80° C. and 95° C.) for gold-coated stainless steel coupons coated with four bilayers of $SiO_2$/C-442 (polymer) and for gold-coated stainless steel samples coated with four bilayers $SiO_2/TiO_2$. In FIG. 3, the $SiO_2$/C-442 coated coupons are shown to exhibit a significant increase in contact angle while the $SiO_2/TiO_2$ coated coupons only show a minimal increase. This suggests that the former coupons are losing a significant amount of $SiO_2$ such that the measured static water contact angle increases and approaches that of the underlying Au coating. The data in table 1 also clearly support this conclusion. The EPMA results indicate a significant percentage of $SiO_2$ loss for the SiO2/C-442 (98 to 99%) after 792 hrs of 80 C or 90 C water soak; whereas, for the same soaking time duration, the $SiO_2/TiO_2$ coupons exhibited a $SiO_2$ loss of only 30 to 60%. The greater reduction in the electrical contact for the $SiO_2$/C-442 compared with the $SiO_2/TiO_2$ further supports a greater $SiO_2$ loss for the former as the contact resistances decreases and equals the contact resistance of the underlying gold coating.

TABLE 1

| Sample | Test Condition | $SiO_2$ (μg/cm²) at 792 hrs | $SiO_2$ Loss (%) | Ti (kcps) @ 792 hrs | Contact Resistance at 200 psi (mohm cm²) |
| --- | --- | --- | --- | --- | --- |
| Au only | control | <1 | — | — | 22 |
| $SiO_2$/C-442 | control | 116 (time = 0) | — | — | 169 (time = 0) |
|  | 80° C. | 1.7 | 99 | — | 21 |
|  | 80° C. | 2.1 | 98 | — | 19 |
|  | 95° C. | 1.8 | 98 | — | 22 |
|  | 95° C. | 1.3 | 99 | — | 20 |
| $SiO_2/TiO_2$ | control | 35 (time = 0) | — | 1.38 | 49 (time = 0) |
|  | 80° C. | 23 | 34 | 1.42 | 37 |
|  | 80° C. | 22 | 37 | 1.49 | 39 |
|  | 95° C. | 13 | 63 | 1.56 | 31 |
|  | 95° C. | 14 | 60 | 1.14 | 32 |

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed:

1. A method for coating a fuel cell component having a bilayer comprising:

a) contacting a fuel cell component with a titanium oxide-containing liquid to form a titanium oxide-containing layer adhered to the fuel cell component; and b) contacting the fuel cell component with a silicon oxide-containing liquid to form a silicon oxide coating adhered to the titanium oxide-containing layer.

2. The method of claim 1 wherein steps a-b) are repeated a predetermined number of times to produce a plurality of bilayers.

3. The method of claim 1 wherein the titanium oxide-containing liquid includes titanium oxide nanoparticles.

4. The method of claim 3 wherein the titanium oxide nanoparticles have a size from about 2 nanometers to about 100 nanometers.

5. The method of claim 3 wherein the titanium oxide nanoparticles have a size from about 2 nanometers to about 10 nanometers.

6. The method of claim 1 wherein steps a) and b) are repeated several times to form a fuel cell component coated with multiple bilayers.

7. The method of claim 1 wherein the fuel cell component is a bipolar plate.

8. The method of claim 1 wherein the silicon oxide has a negative charge and the titanium oxide-containing layer has positive charge.

9. The method of claim 1 wherein step a) is performed by immersing the fuel cell component in a first bath containing the titanium oxide-containing liquid followed by withdrawal of the fuel cell component from the first bath.

10. The method of claim 1 wherein step b) is performed by immersing the fuel cell component in a second bath containing the silicon oxide-containing liquid followed by withdrawal of the fuel cell component from the second bath.

11. The method of claim 1 wherein the bilayer has a contact angle less than about 40 degrees.

12. The method of claim 1 wherein the bilayer has a contact angle from about 3 to 20 degrees.

13. The method of claim 1 wherein the titanium oxide-containing layer has a thickness from about 2 nm to about 100 nm and the silicon oxide coating has a thickness from about 2 nm to about 100 nm.

14. A method for forming a fuel cell with a coated flow field plate, the method comprising:

placing a membrane electrode assembly between a first flow field plate and a second flow field plate;

contacting the second flow field plate with a titanium oxide-containing liquid to form a titanium oxide-containing layer adhered to the second flow field plate; and contacting the second flow field plate with a silicon oxide-containing liquid to form a silicon oxide coating adhered to the titanium oxide-containing layer.

15. The method of claim 14 further comprising:

interposing a first gas diffusion layer between the first flow field plate and the membrane electrode assembly and a second gas diffusion layer between the second flow field plate and the membrane electrode assembly.

16. The method of claim 14 wherein the titanium oxide-containing liquid includes titanium oxide nanoparticles.

17. The method of claim 16 wherein the titanium oxide nanoparticles have a size from about 2 nanometers to about 100 nanometers.

18. A fuel cell comprising:

a first flow field plate;

a second flow field plate wherein at least one of the first flow field plate and the second flow field plate are coated with a bilayer, the bilayer comprising a titanium oxide-containing layer and a silicon oxide-containing layer; and a membrane electrode assembly including an anode, a cathode, and an ion conducting membrane interposed between the anode and cathode.

19. The fuel cell of claim 18 wherein at least one of the first flow field plate and the second flow field plate are coated with from 1 to 6 bilayers, each bilayer comprising a titanium oxide-containing layer and a silicon oxide-containing layer.

20. The method of claim 5 wherein the titanium oxide nanoparticles have a size less than 7 nanometers.

\* \* \* \* \*